(12) United States Patent
Blasco Claret et al.

(10) Patent No.: US 7,483,365 B2
(45) Date of Patent: Jan. 27, 2009

(54) PROCESS FOR OBTAINING NOTCHES IN THE TRANSMISSION OF SIGNALS OVER THE ELECTRICITY NETWORK

(75) Inventors: Jorge Vicente Blasco Claret, Valencia (ES); Juan Carlos Riveiro Insúa, Valencia (ES); Salvador Iranzo Molinero, Valencia (ES); Luis Manuel Torres Cantón, Valencia (ES); José Abad Molina, Vélez (ES)

(73) Assignee: Diseno de Sistemas en Silicio, S.A., Paterna (Valencia) (ES)

( * ) Notice: Subject to any disclaimer, the term of this patent is extended or adjusted under 35 U.S.C. 154(b) by 682 days.

(21) Appl. No.: 10/937,199

(22) Filed: Sep. 9, 2004

(65) Prior Publication Data

US 2005/0281238 A1    Dec. 22, 2005

(30) Foreign Application Priority Data

Jun. 18, 2004    (ES)    ................................. 200401502

(51) Int. Cl.
*H04J 9/00* (2006.01)
*H04L 5/04* (2006.01)

(52) U.S. Cl. ................... 370/206; 370/203; 370/204; 370/205; 370/207; 370/208; 370/210; 370/212; 370/213; 375/260; 375/240.18; 375/240.19

(58) Field of Classification Search ....................... None
See application file for complete search history.

(56) References Cited

U.S. PATENT DOCUMENTS

| | | | |
|---|---|---|---|
| 5,377,223 A | 12/1994 | Schilling | |
| 6,577,670 B1 | 6/2003 | Roberts | |
| 7,164,724 B2 * | 1/2007 | Koga et al. | 375/260 |
| 2002/0126768 A1 * | 9/2002 | Isaksson et al. | 375/298 |

FOREIGN PATENT DOCUMENTS

| WO | WO 00/04657 | 1/2000 |
|---|---|---|
| WO | WO 01/41383 A2 | 6/2001 |

* cited by examiner

*Primary Examiner*—Chi H Pham
*Assistant Examiner*—Raj K Jain
(74) *Attorney, Agent, or Firm*—Klauber & Jackson, LLC

(57) ABSTRACT

This permits the transmission of signals over the electricity network in such a way that the spectral density of power is adjusted to the regulations in the current rules by means of the possibility of introducing notches in transmission in an efficient manner. It is characterised by the adjustment of the power in one or more carriers of an OFDM signal for generating these notches, through the use of IDFTs of at least 1024 points (if the IDFT is complex) or at least 2048 points (if the IDFT is real) and through the use of a window to multiply the symbols to be transmitted in time.

6 Claims, 5 Drawing Sheets

PROCESS FOR OBTAINING NOTCHES IN THE TRANSMISSION OF SIGNALS OVER THE ELECTRICITY NETWORK

RELATED APPLICATIONS

The present application claims priority from Spanish Application Serial No. 200401502, filed on Jun. 18, 2004. Applicants claim priority under 35 U.S.C. §119 as to said Spanish application, and the entire disclosure of said application is incorporated herein by reference in its entirety.

OBJECT OF THE INVENTION

The present invention, as expressed in that stated in this descriptive report, refers to a process for obtaining notches in the transmission of signals over the electricity network. A notch is defined as a frequency band in which the density of power transmitted is less than the certain value required. This process is specially important in the creation and use of the transmission system over the electricity network, as it permits the power of the signal transmitted to be adjusted to different frequencies so that it can adjust to the regulations established by the current rules in different countries for the transmission of signals over the electricity network, with the adequate notches specified by these rules. In this way, interference with licensed services that use the same frequency band as the signal transmitted by the communications over the electricity network will be avoided.

BACKGROUND TO THE INVENTION

The means of communication constituted by the electricity network, both low and medium voltage, is a means that was not initially conceived for the transmission of telecommunications signals. This means is an unscreened means in which the signal transmitted can radiate and interfere with other systems that are using the same frequencies. The case of amateur radio enthusiasts and other radio-communications services that include radio navigation, emergency services, etc. are relevant. In these services, a low interfering signal can interrupt the communication, for which reason it is particularly important to avoid power transmission at these frequencies.

It is because of this that the rules in force in many countries impose restrictions on power spectral density (PSD) that can be transmitted on certain frequencies, so that it is necessary to obtain deep notches for transmitting signals over the electricity network according to the rules. The process that is the object of the invention is designed to create notches of great depth with the maximum efficiency possible, covering the bandwidth strictly necessary.

This process seeks the adjustment of the signal transmitted to certain patterns of power imposed by the aforementioned legal reasons in an efficient manner. These power patterns tend to be defined as frequency ranges in which power transmission is strictly limited (for example, 30 dB less with respect to other frequencies) or even prohibited. Nevertheless, given the technological limitations it is not possible to obtain immediate transition between a frequency band with a particular power spectral density and another one with a different power spectral density, so it is not possible to abruptly eliminate the signal transmitted in a certain frequency range without reducing the power of the adjacent carriers to the notch. Thanks to the invention process this reduction can be performed in an efficient manner, by reducing the number of carriers adjacent to the notch affected by generating this notch to the maximum.

On the other hand, the windowing concepts and precisely the risen cosine window, are not inventions of this process, but are also known in the state of the art. For example, they can be found in texts on telecommunications such as "Digital Communications" by John G. Proakis from the McGraw-Hill publishing company, in "Discreet-Time Signal Processing" by Alan V. Oppenheim from the Prentice Hall publishing company and in "OFDM for Wireless Multimedia Communications" by Richard Van Nee and Ramjee Prasad from the "Artech House Publishers" company. In the first reference it is commented that the risen cosine window is used for the design of limited signals in the band (to avoid any interference between symbols), while in the last reference it is commented that the windowing process applied to the individual OFDM symbols is applied in the reduction of the spectrum of the signal outside the band.

The new aspect of the invention process lies in producing notches of more than 30 dB in a band in an efficient manner, by means of adjusting the power sent in certain carriers, the windowing of OFDM symbols plus the cyclic prefix and the use of suitable values for the number of active carriers and the size of the IDFT; something that cannot be deduced from the previous state of the art of this patent.

DESCRIPTION OF THE INVENTION

In order to achieve the objectives and prevent the inconveniences indicated in previous sections, the invention consists of a process for obtaining notches in the transmission of signals over the electricity network that includes sending signals by means of orthogonal frequency division multiplexing (OFDM), where the communication nodes have a transmitter, means for adding a cyclic prefix and means for converting frequency to time of OFDM symbols.

This process is characterised by the fact that it adjusts the power of one or more OFDM signal carriers selectively by means of attenuation or by the elimination of these carriers, because it applies the inverse discreet Fourier transform (IDFT) that is used to transform the signal for frequency domain to the time domain signal with a number of points that can be selectively greater than or equal to 1024 if the IDFT is complex or greater than or equal to 2048 if the IDFT is real, and because, once the cyclic prefix has been added, the OFDM symbols in the time domain are multiplied by a window. Thanks to this, it is possible to achieve abrupt notches of 20 dB in depth, which is a great advantage since it possible for the signal transmitted not to interfere with other licensed services that use the same frequency bands as the signal that is to be transmitted over the electricity network. In the same way, the invention process permits the power spectral density selected for transmitting the signal to be adjusted, thanks to the possibility of introducing notches in the band.

In the execution of the invention, the window used is a risen cosine window. This window was selected for having a flat area in time and due to its spectral characteristics.

In another execution of the invention, this risen cosine window, which can be defined from the rolloff factor, has a rolloff factor of less than or equal to 0.2.

Furthermore, the window has a size in the number of samples that is greater than or equal to 2048, where these samples are digital samples previous to the digital analogue converter (DAC) of the transmitter.

On the other hand, the number of carriers whose power is adjusted depends on the situation, width and depth of the notches and the form of the window selected for the process.

To produce a notch of suitable depth, the power of the carriers located in the notch and the number of carriers adjacent to the previous ones are adjusted. The faster the secondary lobes in the frequency representation in the window selected roll off, the fewer the number of the adjacent carriers that have to be adjusted for reaching the width and depth of the notch required. To make power adjustments to the suitable carriers, various processes can be used that can be combined. The adjustment can be made through gradual attenuation, so that the main lobe of the signal transmitted in the carriers in the notch, or the secondary lobes of the signals transmitted if the said carriers are adjacent, whether less than the power spectral density required for the signal transmitted.

Another way of performing the adjustment is the direct elimination of the carriers affected, this elimination referring to not transmitting any power in the carriers to be adjusted, in such a way that the carriers located in the notch are eliminated together with a number of adjacent carriers suitable for ensuring that the power spectral density is less than that required for the signal transmitted in the notch.

The two adjustment processes can be used independently in the carriers necessary or can be combined, being able to eliminate certain carriers and attenuate others.

In order to facilitate best understanding of this descriptive report and forming an integral part of it, some figures are included below in which the object of the invention is shown as an illustration and not limiting in any way.

DESCRIPTION OF AN EMBODIMENT OF THE INVENTION

A description is given below of an example of the invention, making reference to the numbering adopted in the figures.

In the transmission of signals and the design of communications systems over the electricity network, one of the most important problems is that the transmission means is not screened and part of the signal transmitted to the electricity network is transmitted to the exterior, being able to interfere with licensed systems that use a range of frequencies overlapped by the range of frequencies used in the signal transmitted.

Figure 1:
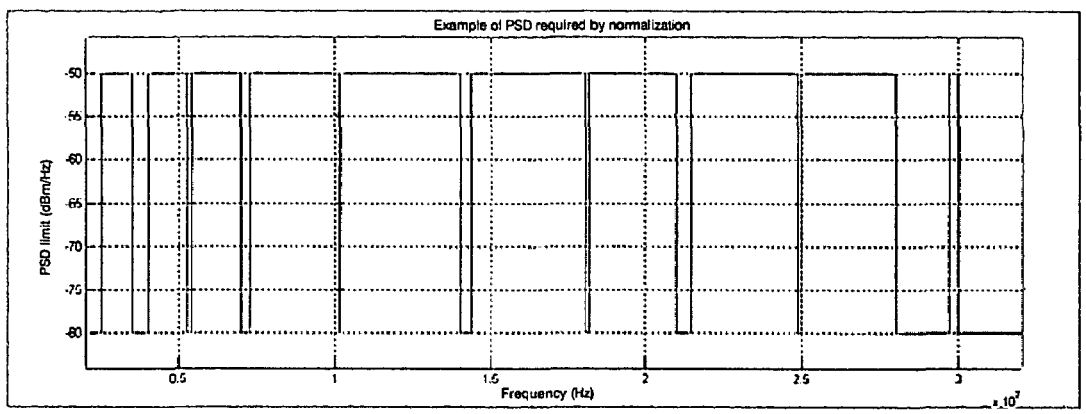
FIG. 1.—This shows an example of power spectral density (PSD) that the rules require for the transmission of signals on the 2 to 30 dB bandwidth for protecting services licensed on these frequencies.

With the object of reducing this interference, many countries have rules on the maximum power spectral density that can be transmitted or introduced in the electricity line. Unfortunately, these rules vary from one country to another and therefore it is necessary to create abrupt notches in the spectrum that can be adjusted to prevent transmitting on certain frequencies depending on the country. An example can be seen in FIG. 1 of the power spectral density that will be required to be able to transmit signals between 2 and 30 MHz. As can be observed, multiple notches exist that have to be respected in order to transmit on this bandwidth.

The invention process allows the creation of these notches in the signal transmitted in an efficient manner and, therefore, adjust to the adequate spectral density in any case.

As explained previously, the invention process uses the windowing concept, which is known in the state of the art. Unfortunately, depending on the technical source chosen this concept can be interpreted in one way or another, for which reason before including an example of the execution of the invention process, the "window" definition criterion used in this process will be stated.

Figure 2:
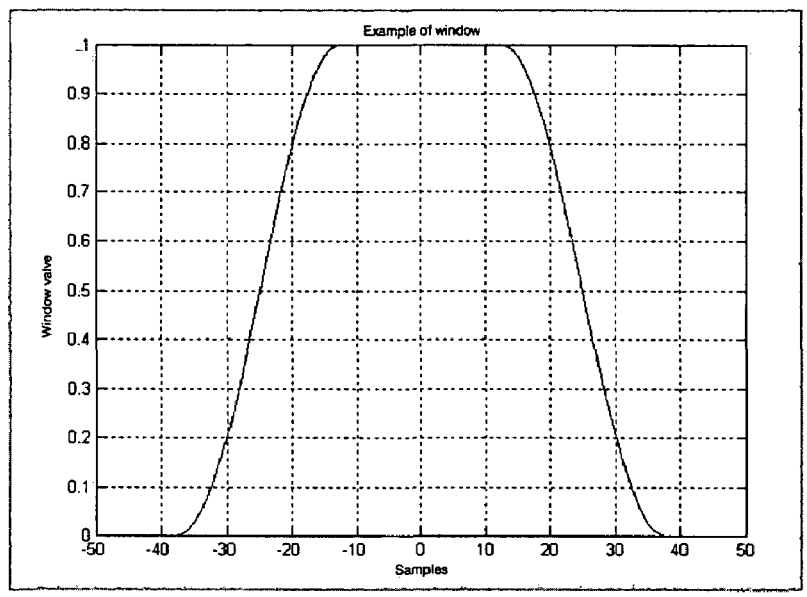
FIG. 2.—This shows an example of a window that can be used in the invention process.

Windowing a digital signal consists of multiplying the samples of a signal by a window. This window is another digital signal that, in general, has a set of adjacent samples different from cero. An example of a window centred on sample 0 can be seen in FIG. 2.

Figure 3:
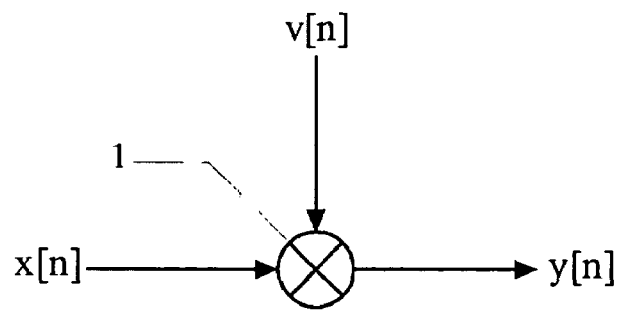
FIG. 3.—This shows a block diagram of the windowing process of a sampled signal.

Once the window to be used in the process has been chosen, it is necessary to carry out the windowing. The signal windowing process can be seen in FIG. 3. This windowing is performed by means of multiplying (1) the signal samples by the window samples (for which the window has to move to the appropriate position, instead of sample 0). The signal windowing process (multiplication of the time domain) affects the signal in the frequency domain. This dependence can be observed in the modulation or windowing theorem:

$$y[n] = x[n]v[n] \Leftrightarrow Y(e^{j\omega}) = \frac{1}{2\pi}\int_{\pi}^{\pi} X(e^{j\theta})V(e^{j(\omega-\theta)})d\theta$$

Figure 4:
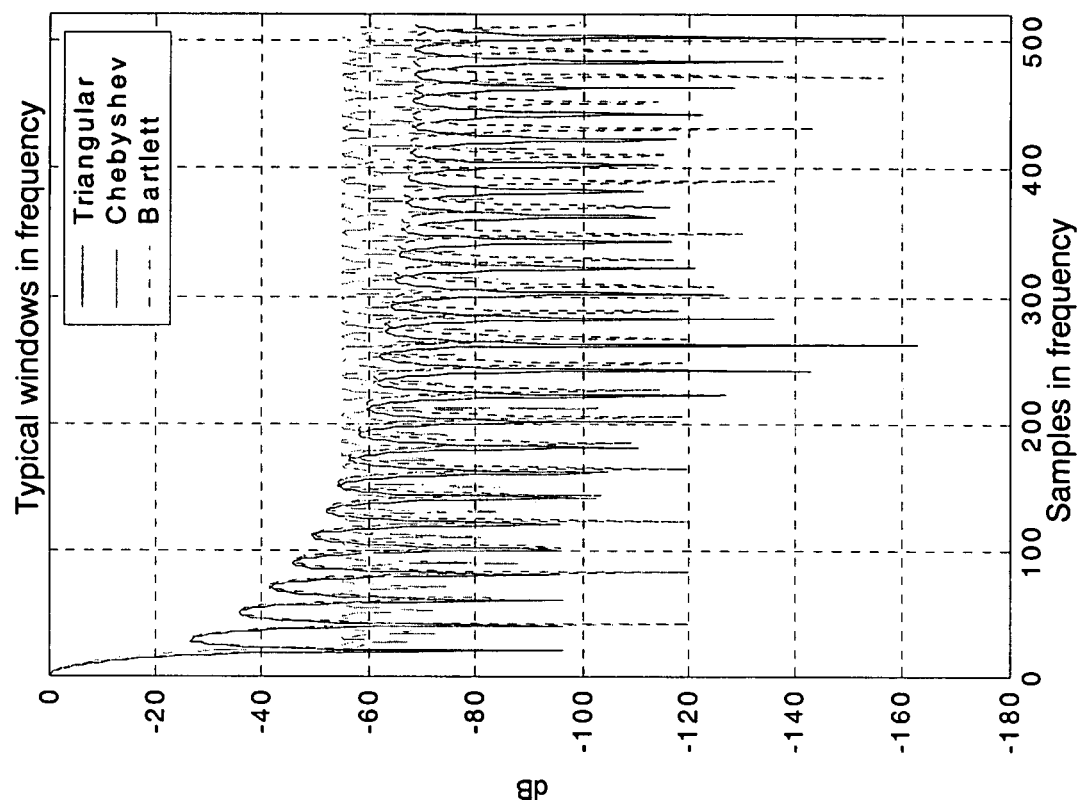
FIG. 4.—This shows various typical windows both in time and in frequency.
Figure 4:
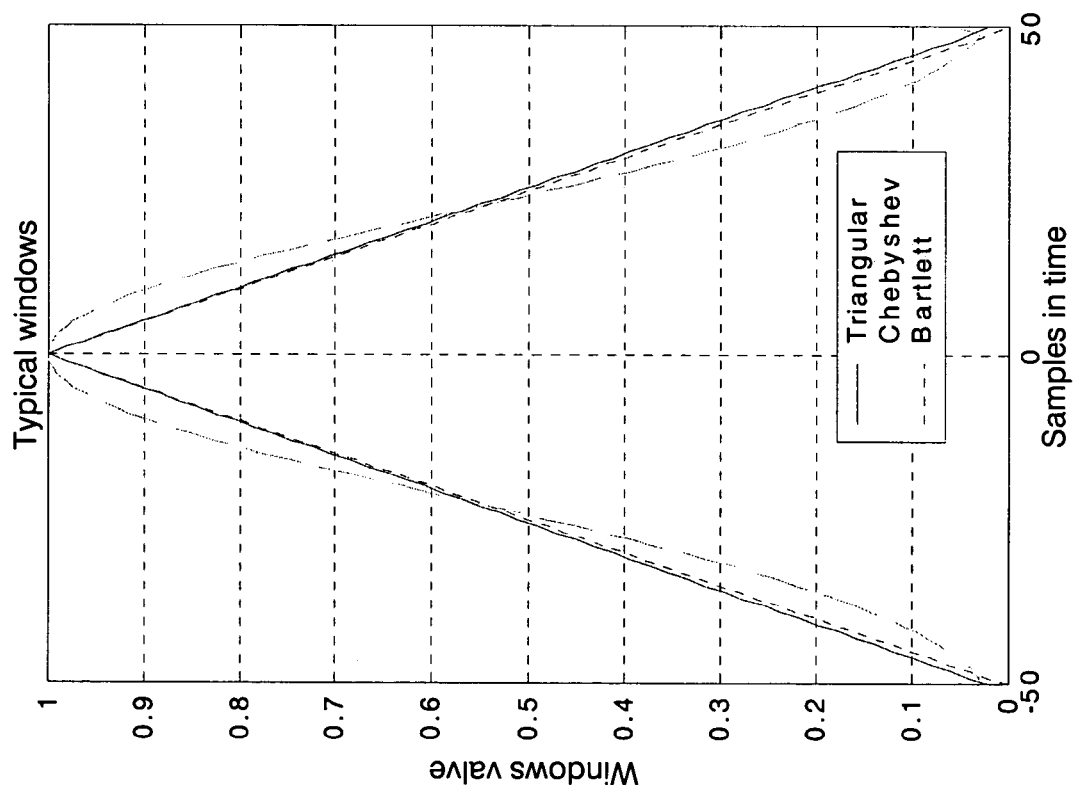

This theorem shows that multiplication in the time domain produces a periodic convolution of the shape of the window in the frequency domain. The secondary lobes of the window in the frequency domain will determine the frequency form of the y[n] output signal. The shape in the time and frequency domain of some typical windows (triangular, Bartlett and Chebyshev) known in the state of the art can be observed in FIG. 4. In this figure it can be seen that the shape of the window determines the secondary lobes of the frequency response. For example, the Chebyshev frequency response is maintained constant (in the secondary lobes), while for Bartlett it is higher in the initial secondary lobes but falls very rapidly in the following ones.

Figure 5:
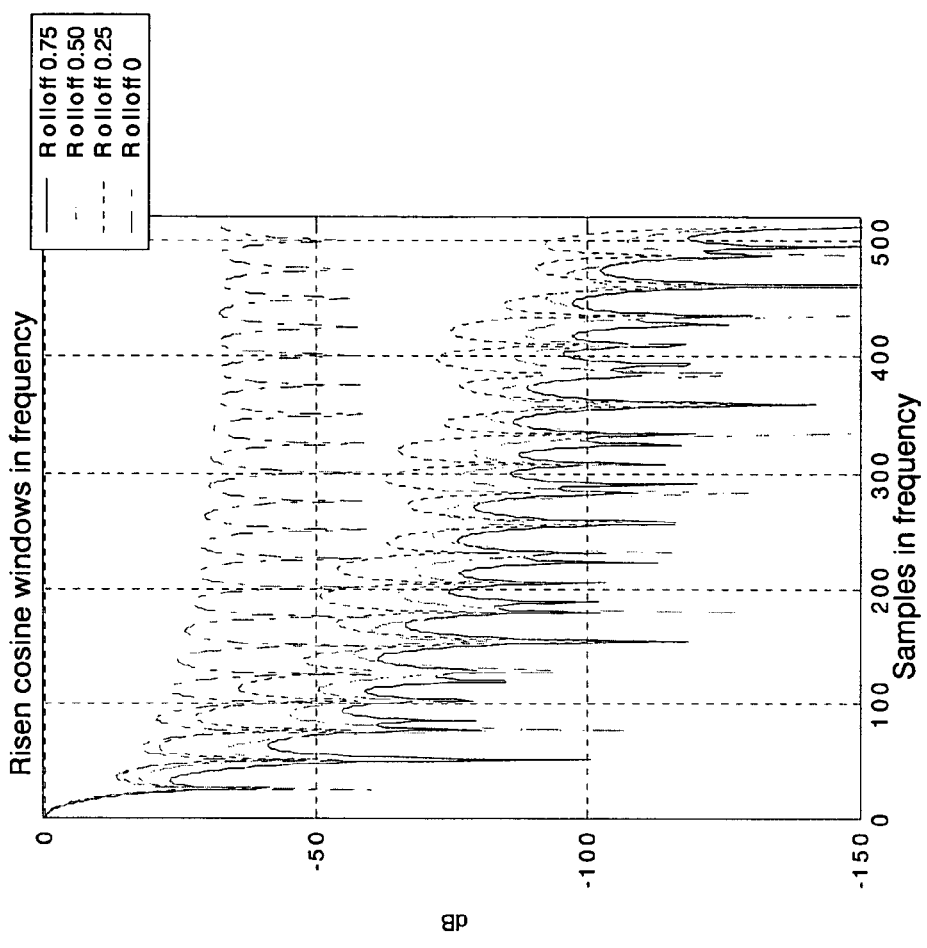
FIG. 5.—This shows risen cosine windows with various rolloff factors ($\beta$) both in time and in frequency.
Figure 5:
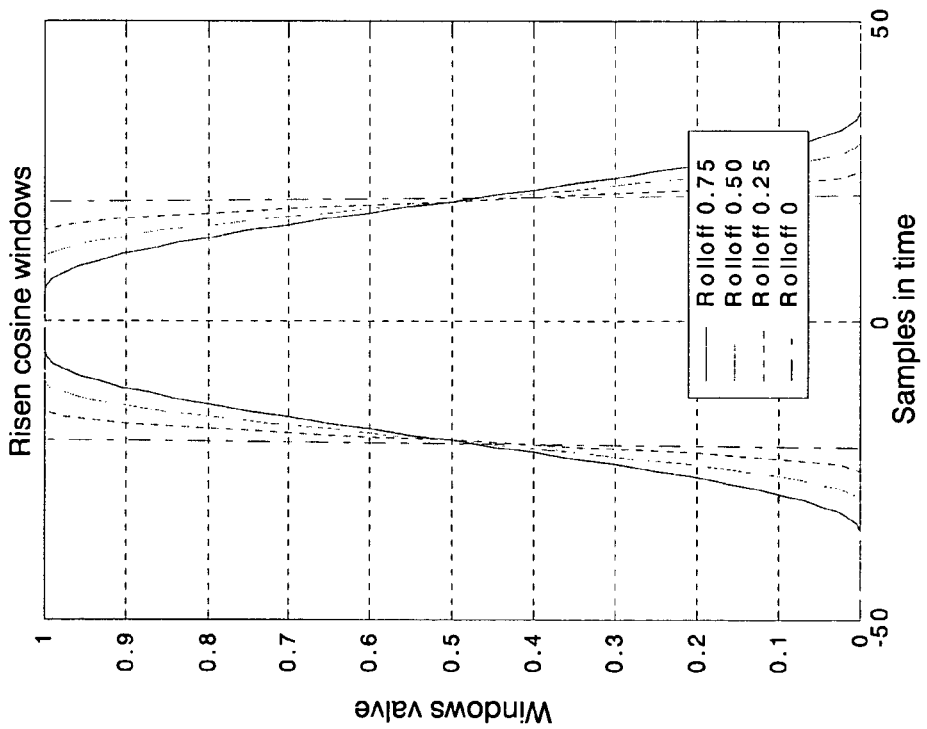

For the execution example described, the preferred window is a risen cosine window. The formula of the risen cosine window centred on sample cero is shown below:

$$v[n] = \begin{cases} 1 & si\, 0 \le |n| \le \frac{1-\beta}{2}\cdot N \\ \frac{1}{2}\left(1 + \cos\left(\frac{\pi}{\beta N}\left(|n| - \frac{1-\beta}{2}\cdot N\right)\right)\right) & si\, \frac{1-\beta}{2}\cdot N \le |n| \le \frac{1+\beta}{2}\cdot N \\ 0 & si\, |n| > \frac{1+\beta}{2}\cdot N \end{cases}$$

Where N is the size of the window defined as the values of the window with value (v[n]) above 0.5, and $\beta$ being the rolloff factor. In general, a risen cosine window can be defined by this rolloff factor $\beta$. This factor will always be between 0 and 1 and indicates the excess signal transmitted. The higher the rolloff factor, the more gentle the rolloff, as can be observed in FIG. 5. Several risen cosine windows both in time and frequency and their dependency on the rolloff factor ($\beta$) are shown in this figure. When the rolloff factor reaches 0, the window becomes a rectangular window that presents secondary lobes with very high frequency.

If the rolloff value is increased, less elevated secondary lobes are achieved in exchange for sacrificing efficiency. This loss of efficiency is due to the fact that the window increases in size (where the excess is calculated as being N*β). On the other hand, if a rolloff factor that is too low is used, efficiency is lost because the secondary lobes do not drop sufficiently and, in this case, it becomes necessary to increase the number of carriers adjacent to the notches that have be adjusted in power.

A way of increasing efficiency while maintaining the rolloff factor is to increase the number of carriers of the OFDM signal. The number of adjacent carriers that have to adjust to create a notch will not vary with regard to the previous case but, since the total number of carriers is greater, the loss in efficiency will be lower in percentage. For this reason, the process becomes applicable from a specific number of IDFT carriers onwards.

When preparing a design for the transmission of signals over the electricity network, it has been calculated that the rolloff factor has to be less than 0.2 in order to have high efficiency. In the same way, the number of samples of the window must be greater than 2048. For this specific example of execution of the invention, a 0.15 rolloff factor, a 0.05 factor and 2600 samples will be used.

Figure 6:
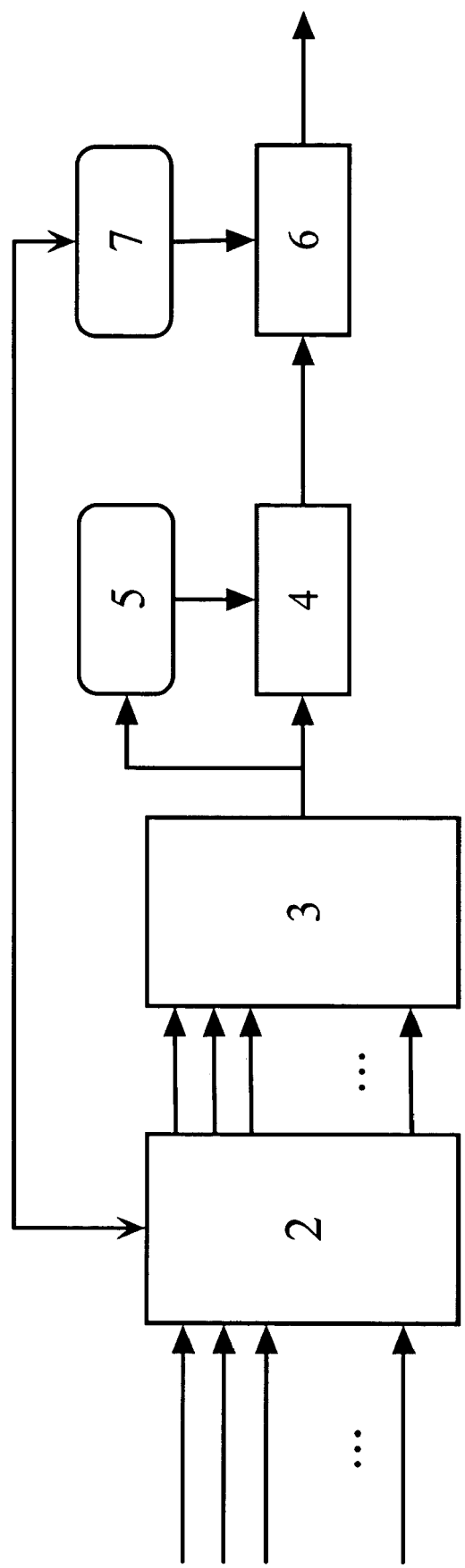
FIG. 6—This shows a block diagram of the process for creating notches in transmission.

To carry out the invention process on the signal being transmitted (once the window has been chosen), a block diagram like the one shown in FIG. 6 is used. In this figure, the signal to be transmitted is entered in each OFDM signal carrier in a block (2) that adjusts the power of the appropriate carriers to create the necessary notches. Carriers located in the notch together with their adjacent carriers will mainly be adjusted. The greater the rolloff of the secondary lobes in the risen cosine window chosen, the lower the number of adjacent carriers will have to be affected to achieve the notch. Afterwards, block (3) in this example of execution carries out the inverse fast Fourier transform (IFFT) in a complex manner that is usually used to implement the inverse discrete Fourier transform (IDFT) with OFDM modulations. Following this, block (4) inserts the cyclic prefix generated by block (5) and block (6) multiplies the digital signal of the time domain by the window generated by block (7). For the notch generation process to be efficient it is necessary to use an OFDM with multiple carriers and IFFT with a great number of points. In this example of execution, a complex 1024-point IFFT is used.

Finally, before transmitting and although this block does not appear in FIG. 6, the digital signal will be converted to an analogue one by means of the DAC converter.

To achieve abrupt notches the attenuation or elimination of the carriers located in the frequency positions within the notch is not sufficient. This is due to the fact that there is power remaining due to the secondary lobes of the adjacent carriers which is produced, to a large extent, due to the transitions of the OFDM signal that reach the spectral area where the notch should be. To avoid this it is necessary to adjust the power or to also eliminate a certain number of carriers adjacent to the carriers located in the positions at the ends of the notch. This is dealt with by block (2) in FIG. 6. Depending on the shape of the risen cosine window generated by block (7), the number of adjacent carriers whose power has to be modified will be greater or lesser, for which reason both blocks are inter-related.

Figure 7:
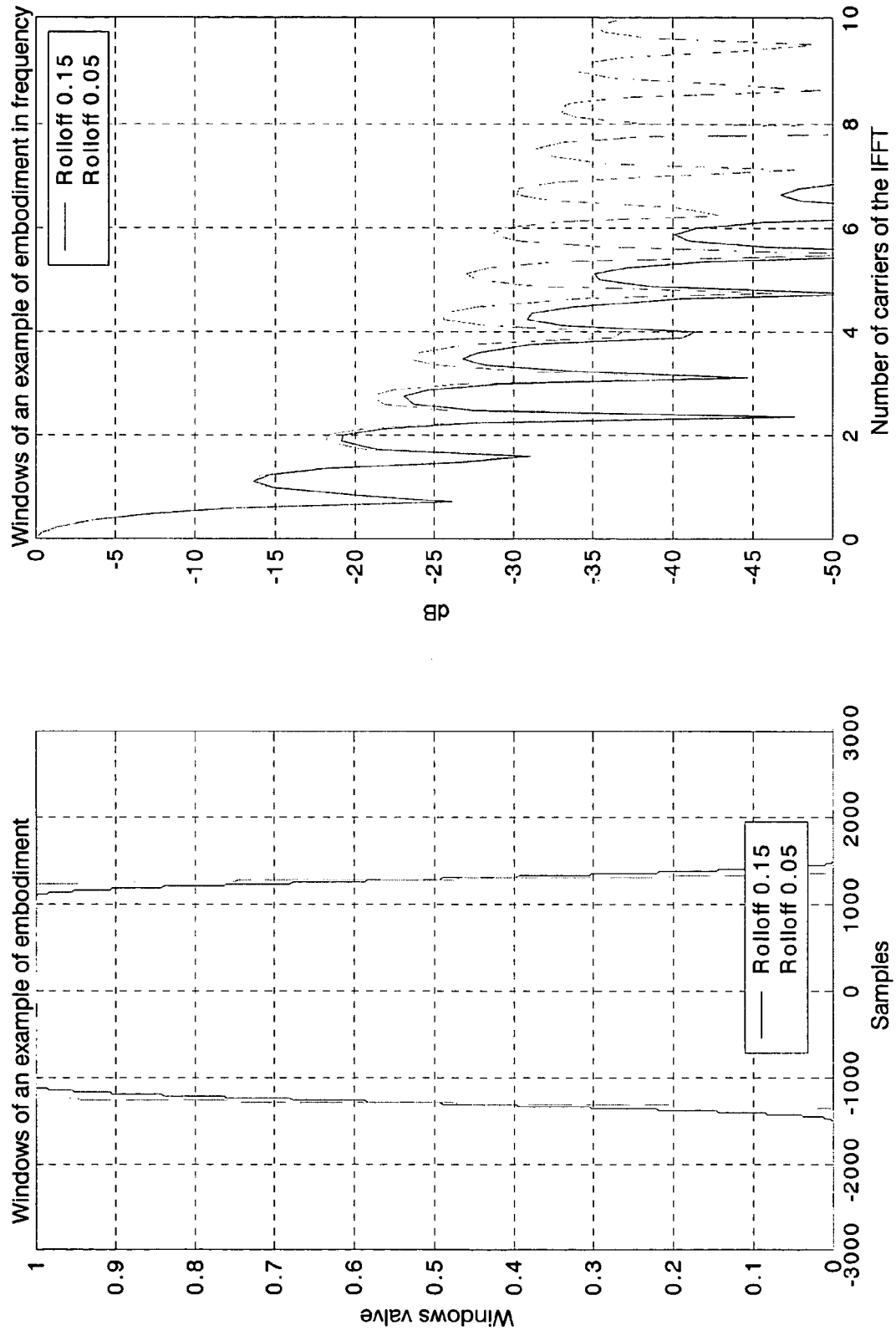
FIG. 7—This shows the windows used in the example for achieving a 30 dB deep notch.

The shape of two risen cosine windows with the values chosen in this execution example (rolloff factor 0.15 and rolloff factor 0.05, and number of samples 2600) can be seen in FIG. 7. In this case, for example, if a 30 dB deep notch is to be achieved, the power of 4 adjacent carriers would have to be adjusted in the case of using the invention process with one risen cosine window with a rolloff factor of 0.15 and a total of 7 adjacent carriers in the case of using a rolloff factor of 0.05.

The invention claimed is:

1. Process for obtaining notches in the transmission of signals over the electricity network, that includes sending signals by means of orthogonal frequency division multiplexing OFDM, where communication nodes have a transmitter, means for adding a cyclic prefix and means for converting the OFDM symbols from frequency domain to time domain, where each carrier of the OFDM has a main lobe and a plurality of secondary lobes; wherein this includes: adjusting power of one or more OFDM signal carriers by means of a process selected from attenuation, elimination and a combination thereof over the OFDM signal of these carriers, wherein adjusting the power of one or more OFDM signal carriers is by means of gradual attenuation comprising that both the main lobe of the signal transmitted in the carriers within the notch and the secondary lobes of the signals transmitted in the adjacent carriers are lower than the power spectral density, PSD, demanded for the signal transmitted in the notch; applying a inverse discrete Fourier transform IDFT that is used to transform the signal from frequency domain to time domain signal with a number of points of at least 1024 if said IDFT is complex, and of at least 2048 if the IDFT is real;

adding a cyclic prefix; and multiplying the OFDM symbols in the time domain by a window; to achieve an effect selected from achieving abrupt notches of over 30 dB in depth and without interfering with other licensed services that use the same frequency bands, achieving compliance with the power spectral density required for transmitting the signal and a combination thereof.

2. Process for obtaining notches in the transmission of signals over the electricity network, according to claim 1, wherein the window used to obtain the abrupt notches is a risen cosine window.

3. Process for obtaining notches in the transmission of signals over the electricity network, according to claim 2, wherein the risen cosine window has a maximum rolloff factor of 0.2.

4. Process for obtaining notches in the transmission of signals over the electricity network, according to claim 1, wherein the window has a number of samples of at least 2048, where said samples are digital samples previous to a digital-to-analog converters, DAC of the transmitter.

5. Process for obtaining notches in the transmission of signals over the electricity network, according to claim 1, wherein the power of the carriers located at the frequencies of the notch and the power of a number of the carriers adjacent to the frequencies of the notch are adjusted, where said number of adjacent carriers depends on the position, width and depth of the notch, and said number of adjacent carriers is lower the faster the secondary lobes decrease with the window used at the transmission process.

6. Process for obtaining notches in the transmission of signals over the electricity network, according to claim 1, wherein the adjustment of the power of the carriers is made by means of the elimination of carriers, this elimination referring to not transmitting any power in the carrier to be adjusted, to eliminate the carriers located within the notch and a sufficient number of adjacent carriers to achieve that the power spectral density, PSD, is less than that required for the signal transmitted in the notch.

* * * * *